May 30, 1944.  V. W. MORAY  2,349,828
METHOD OF AND APPARATUS FOR BENDING AND FORMING
TUBING, RODS, WIRES AND THE LIKE
Filed Aug. 5, 1939  5 Sheets-Sheet 1

INVENTOR
VIRGIL W. MORAY.
BY
ATTORNEY

Patented May 30, 1944

2,349,828

UNITED STATES PATENT OFFICE 2,349,828

METHOD OF AND APPARATUS FOR BENDING AND FORMING TUBING, RODS, WIRES, AND THE LIKE

Virgil W. Moray, Bronx, N. Y.

Application August 5, 1939, Serial No. 288,512

46 Claims. (Cl. 153—65)

This invention relates to tubes, tubing, rods, wire and the like, and more particularly pertains to methods of, and apparatus for, bending or coiling and forming tubing, rods, wire and the like.

Heretofore in the art, tube bending has been accomplished generally by the use of a ball mandrel which is inserted within the tube and serves to maintain the form of the tube in the region where the bending is effected by the support afforded by the mandrel on the inner surface of the tube. The use of this method of bending involves numerous steps and the use of a different size mandrel for each diameter of tube to be bent. When the tubing to be bent is greater in length than 36 feet, the tubing is coiled when received from the tube mill and must be straightened so that the mandrel and rod may be inserted within it. This straightening operation hardens the metal of the tubing so that it must be annealed again which requires the use of a long, straight annealing oven, and the tubing must be supported adequately to prevent it from acquiring a serpentine form during the annealing operation and afterwards. After annealing, the inner surface of the tubing must be oiled, after which the tubing is placed over the mandrel rod, always a hand operation, and the tubing is bent on a grooved form, also a hand operation. Subsequent to bending, the mandrel and rod are removed from the tube, the oil in the tube is washed out and the tubing is cleaned with an acid bath. Quite obviously, this method of bending tubing is cumbersome, time-consuming and expensive.

The present invention overcomes the disadvantages of prior methods and provides a motor-driven machine which is capable of bending tubing, rods, wire and the like into coils of various diameters and shapes as well as forming these articles as desired, by the use of adjustable mechanism, so that separate tools for each size or shape of coil to be formed are not required.

With the method and apparatus of the present invention, the tubing or other article is allowed to flatten or to distort within limits while being bent, whereas in prior methods, ball mandrels, grooves, forms and the like, were provided expressly to forestall any distortion in the tubing during the bending operation. In the description to follow, and in the claims, the word "tube" or "tubing" is intended to include rods, wires and the like. After the tubing is bent in accordance with the present invention, it is immediately restored approximately to its original circular cross-section. Additionally, with the present invention, the shape or cross-sectional configuration of the tubing may be readily altered and the tube diameter may be reduced easily. For example, a round tube may be made into a square tube and this is effected simply by utilizing tools of the required shape through which the tubing is run. Also, if the tools have undersized grooves, the tubing will be squeezed to a smaller diameter, and in consequence will have a thicker wall. With the present invention, no preliminary treatment of the tubing is required excepting for annealing in cases where the tubing is to be bent to a small radius of curvature, and steel tubing may be bent or coiled as well as copper tubing. Rolling contact is provided between the tubing and the forming members, so that long life of the machine elements is possible. The tubing may be grooved simultaneously with the bending, and the tubing may be grooved longitudinally or transversely, or both, on all sides of the tubing during the bending operation, if desired.

The invention will be understood from the following description when considered in connection with the accompanying drawings forming a part thereof, and in which.

Like characters of reference refer to the same or to similar parts throughout the several views.

Referring to the drawings, particularly to Figs. 1 to 8, reference character 10 designates the bed of the machine which provides the support for the several elements of the machine. The machine is driven by an electric motor 11, the armature shaft of which has a small sprocket over which runs a chain 12 which drives a large sprocket fixed to shaft 13 on which freely runs a bevel gear 14 and a bevel gear 15. A clutch 16 operated by a lever 17 serves to connect either bevel gear 14 or 15 to shaft 13, so that bevel gear 18 which meshes with both gears 14 and 15 and the tube bending and forming mechanism, may be driven in one direction or in the opposite direction. Gear 18 drives bevel gear 19, which meshes with and drives bevel gear 20 fixed to drive shaft 21 which is supported in bearings 22 and 23.

Figure 7:
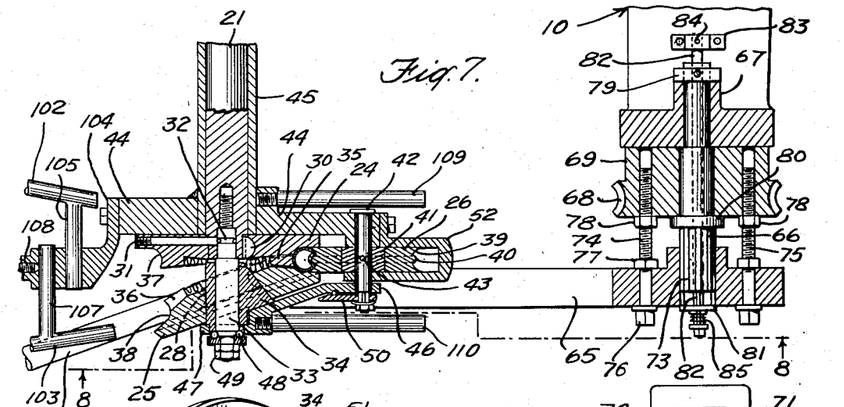
Fig. 7 is a sectional view taken on line 7—7 of Fig. 1.

At the outer end of drive shaft 21 is disposed the bending and forming mechanism which includes a straight disc 24, a slant disc 25, a radius roller 26, a top feed roller 27, a bottom feed roller 28, and a tube preshaping device 29. As shown in Fig. 7, straight disc 24 is disposed normally to the shaft 21 and is carried by and fixed to the reduced outer end portion of the shaft by key 30 and set screw 31, the inner end of which is received in an annular groove 32 of a pin 33 threaded into the outer end of the shaft 21, and serves to retain this pin in position. Slant disc 25 rotates freely on a frusto-conical bearing 34 which is rotatably mounted on the pin 33, the relationship between the pin and the bearing surface being such that the slant disc is at the desired angle to the straight disc. The discs 24 and 25 are provided with meshing bevel gears 35 and 36 on their adjacent faces inwardly of their outer peripheries, to cause the slant disc to be driven by the straight disc. Each disc 24 and 25 is further provided with a tube receiving annular groove 37 and 38 between the periphery of each disc and the gears 35 and 36, the contour of these grooves providing at the point of tangency of the two discs, a single groove having a semi-circular transverse configuration.

Radius roller 26 is mounted so that it can be moved about the discs 24 and 25 to vary the radius of curvature of the bend to be imparted to the tubing, and so that it can be moved radially inwardly and outwardly of the discs 24 and 25. The roller 26 has a concave periphery 39 with an annular ridge 40 centrally of the disc, and the roller has a thickness such that it enters the outer portion radially of the tube receiving groove formed by the discs 24 and 25 and forms therewith as shown, a circular opening excepting for the ridge 40, through which the tube being bent passes. The central ridge 40 may be omitted if desired, in which event the groove will be arcuate. The radius roller is freely rotatable on a cam 41, Fig. 7, which is fixed on a shaft 42 by a pin 43. Shaft 42 is mounted on a block 44 which is fixed by welding or the like to an elongated sleeve 45 on shaft 21, and on a connecting strap 46, one end of which has a hexagonal opening which receives a similarly shaped reduced portion 47 on the outer end or base portion of the frusto-conical bearing 34 to provide a rigid connection between the bearing 34 and the shaft 42. A thrust bearing 48 held in position by nuts 49 retains the bearing 34 on pin 33. The position of the nuts 49 on the pin 33 will determine the distance apart at which the discs will operate during bending due to the fact that the distortion of the tubing will thrust them apart. An arm 50 having its inner end splined to shaft 42 and retained thereon by a spring washer and nut as shown, has a detent which is received in a plurality of apertures 51 in strap 46 and provides the means by which the cam 41 is rotated to move the roller 26 toward and away from the discs 24 and 25. The outer end of shaft 42 is supported in one end of a U-shaped supporting member 52 which has its other end bolted to the block 44. The means for moving the radius roller 26 about the pin 33 comprises a worm and gear mechanism 53, the worm being mounted on and operated by shaft 54 which is rotated by crank 55. An indicator 56 on sleeve 45 which moves with respect to a stationary scale 57, shows the position of the radius roller at all times.

Figure 8:
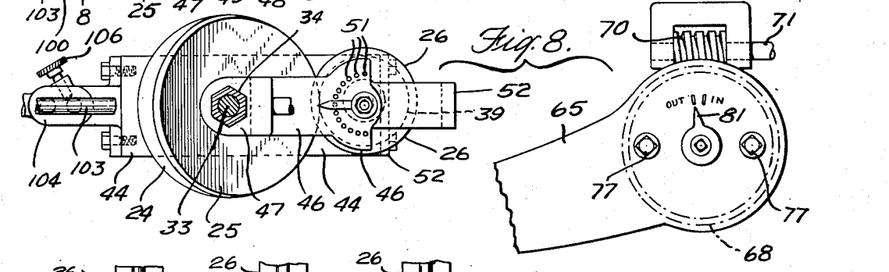
Fig. 8 is a sectional view taken on line 8—8 of Fig. 7.

Top feed roller 27 is carried in a bracket 60 which is mounted to swivel on the outer end of an arcuate arm 61, the inner end of which is connected to a shaft 62 mounted in bearing 63. Bottom feed roller 28 is also carried in a bracket 64 which is mounted to swivel on the outer end of an arcuate arm 65, the other end of which is connected to a shaft 66 mounted in a bearing 67. Both the top and the bottom feed roller are adjustable toward and away from the discs 24 and 25 in a direction radially of the discs, and they are also adjustable in a direction parallel to the axis of shaft 21 which drives the straight disc 24. Inasmuch as the details of this adjusting mechanism for the bottom feed roller are shown in Figs. 7 and 8, this mechanism will be described first. A worm wheel 68 forms part of, or is fixed to, a member 69 which is rigidly connected to the central portion of shaft 66 and turns therewith. A worm 70 on shaft 71 which is rotated by a hand crank 72, serves to rotate worm wheel 68 and to move the arm 65 and the bottom feed roller 28 toward and away from the discs 24 and 25 in a generally vertical direction. The outer end 73 of shaft 66 is splined and arm 65 is movable on this shaft in a direction axially of the shaft to move the roller 28 in a horizontal direction toward and away from the discs 24 and 25. To make this adjustment, adjusting bolts 74 and 75 are provided, which are threaded into member 69. The arm 65 is retained at the outer ends of the bolts between the head 76 and a retaining nut 77 which is fixed to the bolt. A lock nut 78 on each bolt locks arm 65 in adjusted position. In making this adjustment, lock nuts 78 are loosened, the bolts 74 and 75 are turned one way or the other until the arm 65 and roller 28 are in the desired position, after which the nuts 78 are turned up tightly against member 69 to maintain the adjustment. Collars 79 and 80 retain the shaft 66 in position in the bearing 67. Indicating means are provided to show continually the position of the arm 65 and roller 28 with respect to the discs 24 and 25 in a vertical direction. As shown, this means comprises a stationary pointer 81 fixed on one end of a rod 82, the other end of which is received in an aperture in a member 83 fixed to the bed 10 of the machine. A pin 84 prevents the rod 82 and the pointer 81 from rotating. The pointer 81 is urged lightly against the face of the arm 65 by a coil spring 85. A scale on the arm 65 cooperates with the pointer 81.

Similar adjusting and indicating means are utilized for the upper feed roller 27. Vertical adjustment is effected by crank 87 on shaft 88 upon which is fixed worm 89 which rotates worm wheel 90. Indicator 91 shows the vertical position of the arm 61 and roller 27. Adjusting bolts 92 move arm 61 in a horizontal direction.

In order to effect a greater degree of bending of tubing in a single bending operation, the machine is provided with a so-called "undergrooving" device 29 which makes a longitudinal groove of the desired depth and width on the tube on that portion which comes in contact with the discs 24 and 25. As shown, the device 29 comprises a housing having a grooving roller 95, a cooperating roller 96 and a third roller 97 spaced laterally of the roller 96. The housing is pivoted on the shaft of top feed roller 27, and its position may be adjusted by a pin 98 which passes through apertures in the housing and an aperture in the bracket 60. With this position adjustment, the device may be swung upwardly out of the way in the event it is not needed. The device 29 also will function as a tube preshaper to impart desired cross-sectional configuration to the tube prior to its contact with the discs 24 and 25 and the radius roller 26, the shape imparted depending upon the character or shape of the surface of the rollers 95 and 96 with which the tubing comes in contact. For example, the "upper half" of the tubing, or the part which comes in contact with the radius roller 26, may be given a slightly triangular or elliptical shape to enable the tube to press against the center of the groove of the radius roller when it is being restored to shape after it has been flattened in bending. In this manner, distortion of the tubing during bending is lessened and the feather edges of the radius roller which engage the discs 24 and 25 are prevented from cutting the tubing as it passes between the discs and the roller.

The device may be used also as a diameter equalizer to impart to the tubing entering the machine from a coil of tubing having loops of different diameters, the same radius of curvature, so that after bending, the curvature will be the same. With this arrangement, the tube engaging surfaces of the rollers 95, 96 and 97 will be concave with no ridges. It will be understood that more than three rollers may be provided if it is desired to obtain a greater accuracy in the radius of curvature of the tubing.

Figures 1, 3:
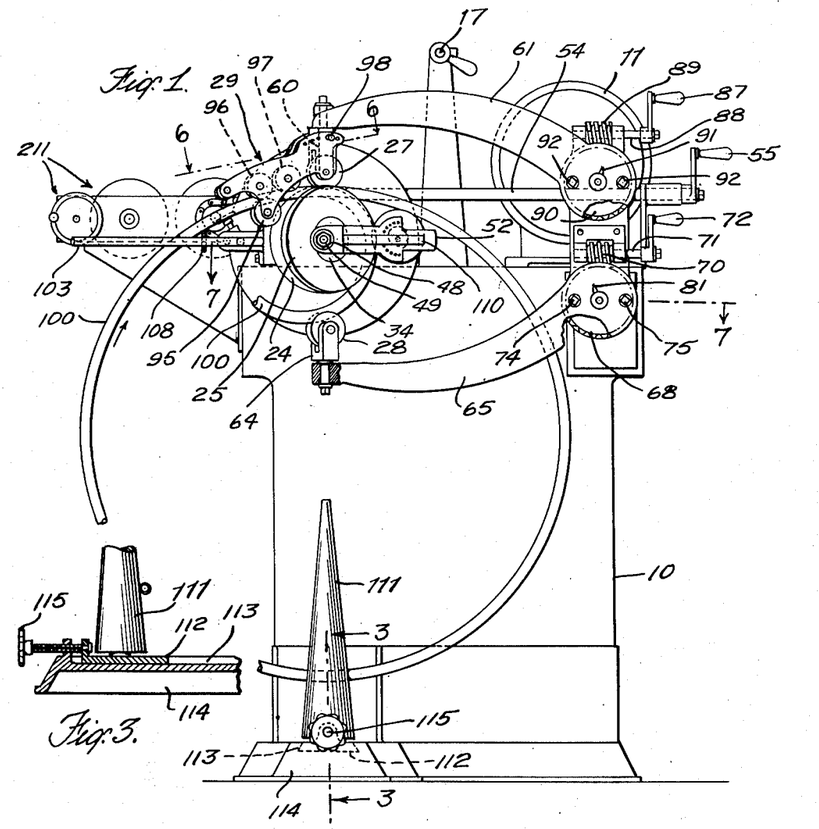
Fig. 1 is an elevational view of a machine embodying the invention.
Fig. 3 is a sectional view taken on line 3—3 of Fig. 1.
Figure 2:
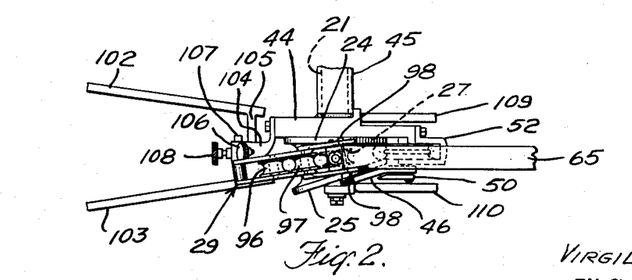
Fig. 2 is a top plan view of a portion of the machine shown in Fig. 1.
Figure 4:
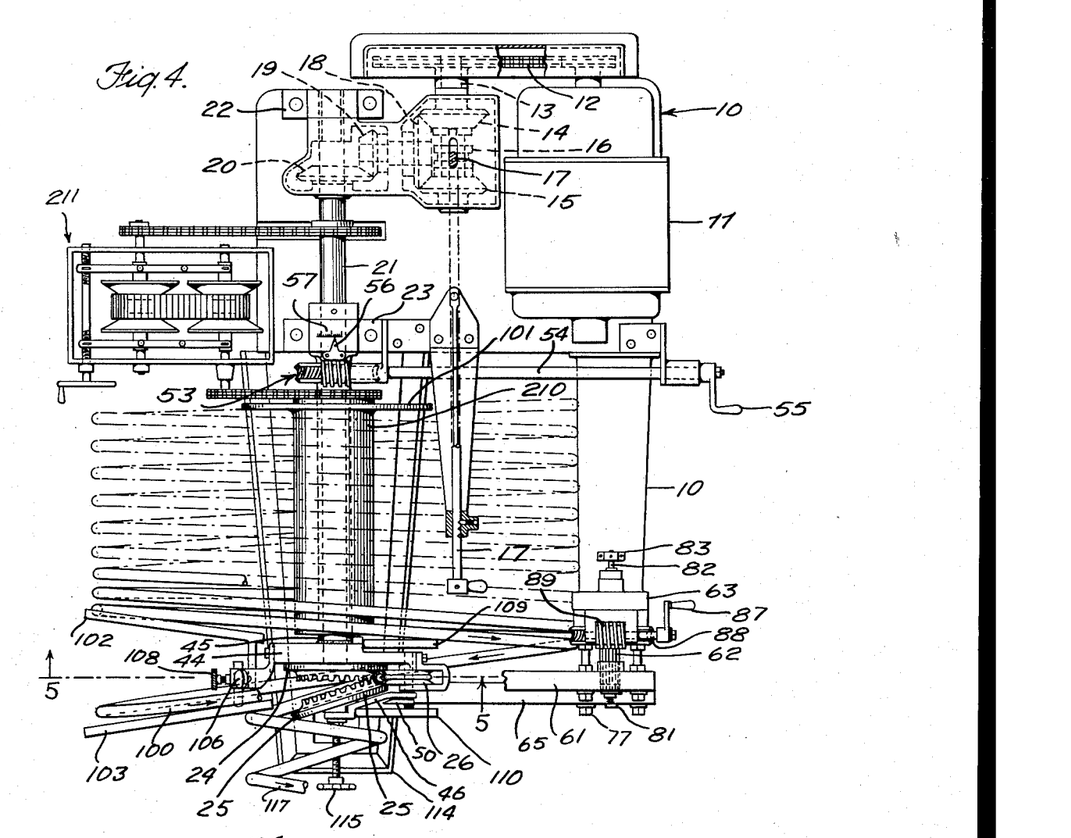
Fig. 4 is a plan view of the machine shown in Fig. 1.
Figure 5:
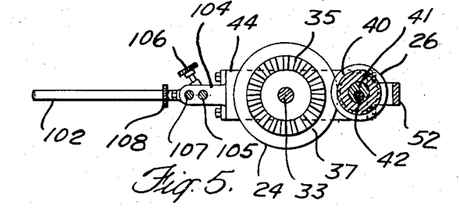
Fig. 5 is a sectional view taken on line 5—5 of Fig. 4.
Figure 6:
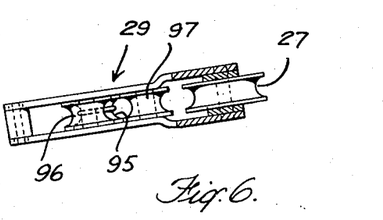
Fig. 6 is a sectional view taken on line 6—6 of Fig. 1.

Ordinarily the tubing to be bent is in the form of a large coil 100 and is placed in the machine by passing it over the discs 24 and 25 until it is in the position shown in Figs. 1 and 4 where it rests upon a drive sleeve 210, Fig. 4, rotatably mounted on sleeve 45, and which is driven from shaft 21 through a variable transmission 211. Suitable means such as the sprocket and chain mechanism shown is utilized to transmit power from shaft 21 to the transmission 211 and from the latter to the sleeve 210. The surface of sleeve 210 may be roughened to increase the traction between the tubing and the drive sleeve. A circular plate 101 fixed to end of sleeve 210 limits the movement of the coil in the direction of the worm and gear mechanism 53. Inner and outer pitch rods 102 and 103 are provided to control, or to assist in the control, of the pitch of the coil of tubing after it has been bent. These rods are adjustably carried by a block 104 which is bolted to block 44. Rod 102 has an arm 105 which is received in an aperture in block 104 and is retained in adjusted position by a set screw 106. Rod 103 has an arm 107 which is received in another aperture in block 104 and is retained in adjusted position by a set screw 108. Inner and outer guard rods 109 and 110 which are threaded respectively into block 44 and connecting strap 46, prevents the coiled tubing issuing from the discs on small pitches from coming in contact with parts of the bending mechanism, and also limit the movement of the tubing coil in the direction of the discs 24 and 25 when the tubing is being fed into the discs from the side of the disc 24 or the disc 25. A floor tubing guide is provided to limit and restrict the movement of the lower portion of the coil of tubing as it rests upon the sleeve 45. This guide comprises a cone-shaped member 111 which is movable in a direction parallel to the axis of shaft 21. Member 111 is mounted on a wedge-shaped slide 112 which moves in a groove 113 in a base 114 of the bed 10 of the machine. An adjusting member 115 moves the cone 111 to the desired position and retains it in the adjusted position.

Figure 24:
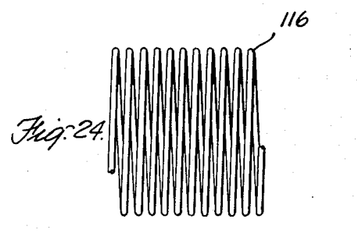
Figs. 24 to 27 illustrate types of coils which may be produced by utilizing the invention.

In operation, the machine may be adjusted to make three different types of tube coils, (1) with loops of the same diameter, (2) with loops of different or varying diameters, and (3) with loops of the same and loops of different or varying diameters. The description to follow will disclose the operation of the machine to produce a tubular coil having loops of the same diameter, with a diameter which is relatively small, like coil 116, Fig. 24. The top and bottom feed roller arms are adjusted away from the discs 24 and 25 in a vertical direction so that the large diameter coil or a series of coils, to be fed into the machine may be put in position back of the block 44 and resting on sleeve 210. Radius roller 26 is then adjusted to its extreme upward position by crank 55, and arm 50 is adjusted to the proper position for the diameter of tubing to be produced. The forward end of the tubing of the coil 100 is pushed by hand into the opening between the discs 24 and 25 and the radius roller 26, it being understood that for the operation being described, the device 29 previously has been moved upwardly out of the way of the entering tubing. With the forward end of the tubing in place, the motor 11 is started for a few seconds and while the motor is running, the radius roller is adjusted to the angle required by crank 55, in order to make a coil or loop slightly larger than the desired final diameter. The top feed roller 27 is moved downward into contact with the tubing by the operation of crank 87. The bottom feed roller 28 is then adjusted to a position in which it will engage a loop of the tubing of the required final diameter as it leaves the discs 24 and 25, which position is known by means of calibrations on the worm of the adjusting mechanism. Inasmuch as the loop of tubing as it issues from the discs is slightly larger than the final diameter desired, engagement of the tubing with the bottom feed roller 28 will impart a further bending to the tubing. Feed roller 28 is then further adjusted by bolts 74 and 75 to place the roller in position to give the required pitch to the tube loop as it leaves the discs 24 and 25 and the radius roller. Lever 17 is then moved to put the disc drive into forward speed and a test loop is made, after which adjustment of the outer pitch rod 103 is made if necessary to obtain the desired pitch. The machine is now put into operation, and it will coil automatically all the tubing in the original coil which was fed to the machine to produce a coil 117 of the desired diameter.

It will be observed that the purpose of the bottom feed roller in this operation beside imparting the desired pitch to the coil, also acts to limit the size of the loops to the final dimension required. Thus, even if the coil of tubing being fed to the machine has loops of slightly different diameters, the combined action of the top feed roller, the discs, the radius roller and the bottom feed roller, will tend to overcome or to minimize any tendency toward the production of loops of different diameters on the machine, since the aforesaid rollers and discs provide a sufficient number of points of contact with the tubing being bent to prevent variations in the size of the loops being formed. Additionally, the bottom feed roller in pressing against the loop, aids the discs to grip the tubing since the pressure of the bottom feed roller tends to keep the tubing in contact with the discs. This is particularly important in case the tube aperture formed by the discs and the radius roller is larger than the outside diameter of the tubing being bent. It will be understood that if the coil of tubing being fed to the machine has loops of the same diameter, the bottom feed roller is not essential to forming a coil having loops of the same diameter, nor is it required to give the loops their pitch, since this can be done by means of the outer pitch rod 103.

Before the last loop is finished, lever 17 is moved to put the disc drive in neutral. To further reduce the diameter of the loops, the machine is reversed. Bottom feed roller 28 is adjusted to act as the feed roller, and the top feed roller 27 is adjusted to provide the required final diameter of the loops and to impart the desired pitch to the loops. The radius roller will be set to provide a size of loop which is slightly larger than the size desired for the reason heretofore mentioned. The drive is put in reverse and a trial loop is made, after which the reverse operation is continued after the inner pitch rod 102 is adjusted, if necessary, to give the desired pitch. If further reduction in size is required, the machine again is run in its forward direction, and the coil is fed outwardly again, and alternate forward and reverse directions of operation are repeated until the tubing has been coiled to the diameter desired. However, prior to each operation in the reverse direction, the radius roller is adjusted closer to the discs 24 and 25 for the reason that the diameter of the tubing tends to decrease with a decrease in the radius of curvature of the tubing, and if the radius roller remains in one position, the outer portion of the tubing will tend to flatten out. By adjustment of the radius roller toward the discs, the tubing remains round.

Should it be desired to effect but a slight reduction in the diameter of the loops of the coil fed to the machine, the radius roller 26 is raised as far as possible to a position adjacent the top feed roller 27, and the roller 27 is raised so that the tubing being fed to the machine is bent but slightly before coming into contact with the radius roller. In this manner it will be perceived that adjustment of the feed roller will accomplish the same result as adjustment of the radius roller.

Pitch also may be imparted to the tubing to form a coil during the bending operation by means of the top feed roller 27 when the tubing is fed into the machine in the direction shown in Fig. 1, independently of any other instrumentality excepting for the discs 24 and 25 and the radius roller 26. The bottom feed roller also will perform the same function when the tubing is fed into the machine in the opposite direction. The magnitude of the pitch and the direction in which the tubing is coiled will depend upon the position of the feed roller with respect to the discs in a direction parallel to the axis of the shaft 21, and this position may be varied by means of the adjustment previously described.

Figure 25:
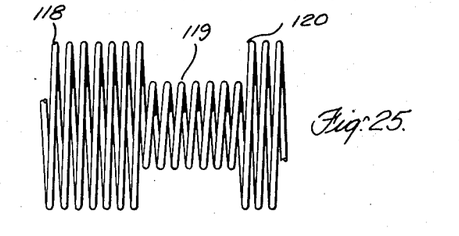

In order to produce a coil having loops of two different diameters as shown in Fig. 25, the portion of larger diameter 118 is produced in the manner already described. When the point is reached at which the smaller loops 119 are to begin, the radius roller is moved to a lower position, or to a position farther away from the top feed roller 27, by operation of crank 55. Then when a sufficient number of smaller loops have been formed, the radius roller is returned to its original position by movement of crank 55 and the larger loops 120 are produced.

Figure 26:
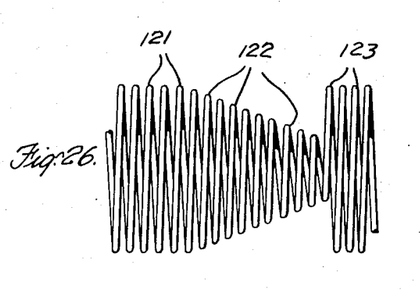

To produce a coil of the type shown in Fig. 26 wherein there are loops of the same diameter and loops of gradually decreasing diameter, the loops 121 of the same diameter are produced in the manner previously described, and when the point is reached at which the loops 122 of decreasing diameter are to appear, the crank 55 is gradually turned in a direction to move the radius roller 26 away from the top feed roller 27 as the tubing continues to be fed into the machine. This is continued until the loop of smallest diameter has been formed, when the radius roller is returned quickly to its original position to produce loops 123 of largest diameter.

Figure 27:
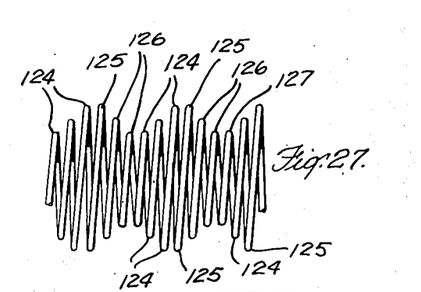

A coil of the type shown in Fig. 27 is produced by gradually moving the radius roller toward the top feed roller to produce the loops 124 of gradually increasing size, the radius roller is retained in its last position to produce the second loop 125 of the largest diameter, the radius roller is then moved away from the top feed roller gradually to produce the loops of gradually decreasing diameter 126, the radius roller is retained in its last position to make a second loop 127 of smallest diameter, and the procedure is repeated as often as necessary to produce the length of coil desired.

Figures 19, 21, 23, 28, 29, 30:
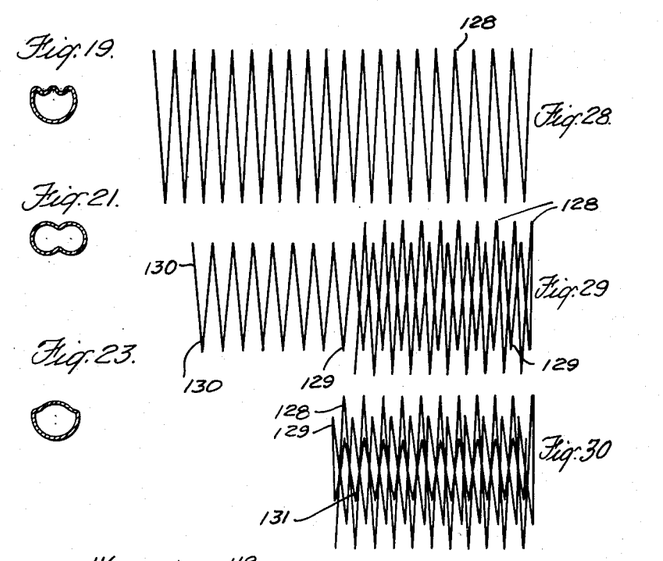
Figs. 28, 29 and 30 show different stages in the formation of the type of coil shown in Fig. 30.
Figure 20:
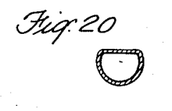
Figure 22:
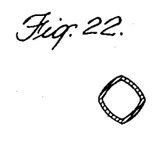

To produce a coil of the type shown in Fig. 30 wherein there are three different sizes of loops, all axially aligned, with the smallest and intermediate sized loops within the largest loop, a coil having loops 128, Fig. 28, of the largest diameter is first produced in the manner previously described and of a length sufficient to provide the tubing length required for the two inner coils. In other words, the length of the coil having loops 128 will equal the axial length of the final coil plus an additional length to provide the tubing for the two inner coils. The coil having loops 128 will issue from the machine as shown in Fig. 4, to provide a coil having a left-hand pitch. This coil is then fed into the machine from the outside, or the side opposite the side from which the tubing was originally fed and with the end last to leave the discs 24 and 25, the first to be fed into the machine, after the radius roller has been adjusted to produce smaller loops. This procedure will produce the coil shown in Fig. 29 having smaller loops 129 within the loops 128, it being understood that the coil is fed from the outside as last described, until the final length of the coil remains with loops of the size of the loops 128. The coil is then removed from the machine and is turned end for end, and the end 130 of the portion having loops 129 is then fed into the machine from the outside thereof as for the production of the loops 129, after the radius roller has been adjusted further for the production of the smallest loops 131 within the loops 129.

Figures 9, 10, 11, 12:
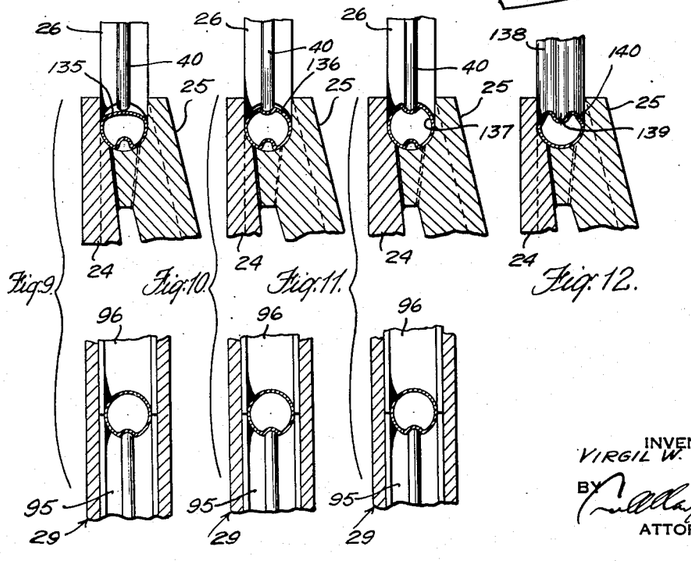
Figs. 9, 10 and 11 are sectional views showing the effect on the cross-sectional configuration of tubing when bent into coils of small, intermediate and large diameters, respectively.
Fig. 12 is a sectional view showing another form of radius roller.

To produce in one operation, a coil having loops of very small diameter from a coil having loops of large diameter, for example, a coil of 4" diameter from a coil 24" in diameter in one bending operation, the attachment 29 is employed, using a roller 95 with a central ridge as shown in Figs. 9, 10 and 11, to produce a longitudinal groove in the underside of the tubing before it comes in contact with the discs 24 and 25 and the radius roller 26. The radius roller will be adjusted, of course, to produce loops of the small diameter desired. With the "under-grooving" described, buckling is prevented on the underside, for the reason that the initial grooving reduces the wall thickness of the tubing by stretching the metal, thus making it easier to bend.

Figs. 9, 10 and 11 illustrate the effect on the ultimate cross-sectional area and the cross-sectional configuration, of bending to different diameters in one operation. In Fig. 9, the tubing 135 is bent from a large to a relatively small radius. The original cross-sectional area is shown in the lower part of Fig. 9 as the tubing is passed between the rollers 95 and 96 of the device 29. Upon being bent on passing through the opening between the discs 24 and 25 and the radius roller 26, the "upper" portion of the tube as shown in the upper part of Fig. 9 has been flattened, and the cross-sectional area has been reduced to such an extent that the ridge 40 in the radius roller does not come in contact with the tube at all. In Fig. 10, the tubing 136 is bent from a large diameter to an intermediate diameter in one operation. With this degree of bending, the cross-sectional area is reduced but slightly and the "upper" portion of the tube as shown in the upper part of Fig. 10 comes in contact with the ridge 40 only of the radius roller and is grooved thereby. In Fig. 11, the tubing 137 is bent but slightly in passing through the machine, consequently the cross-sectional area is reduced only to the extent of the groove produced by the ridge 40 in the "upper" portion of the tubing as shown in the upper part of Fig. 11.

Fig. 12 illustrates a further form of so-called "overgrooving" of the tubing, or grooving on the outer peripheral portion of the tubing. In this instance, the attachment 29 need not be used, or if used, the rollers 95, 96 and 97 have no grooving ridges. The radius roller 138 employed has a wide and deep central ridge 139 and the sides of the roller which engage the tubing 140 are convex, as shown. Obviously, other cross-sectional configurations may be produced by utilizing radius rollers having the proper contour for the tube engaging surfaces.

To produce a coil having loops of the same diameter from a large diameter coil having considerable variation in the size of the loops, the device 29 is utilized to provide a constant curvature to the tubing being fed into the discs 24 and 25. The rollers of the device 29 in this instance may be either plain grooved rollers or they may have ridges which form grooves in the tubing. The device 29 will have the effect of ironing out any variations in the curvature of the tubing entering the discs.

Figure 13:
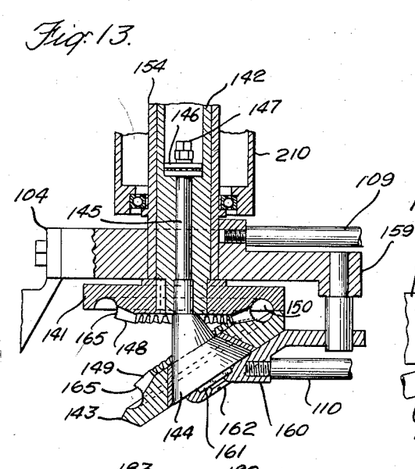
Fig. 13 is a sectional view taken on line 13—13 of Fig. 15, showing another form of bending and forming mechanism embodying the invention.
Figure 14:
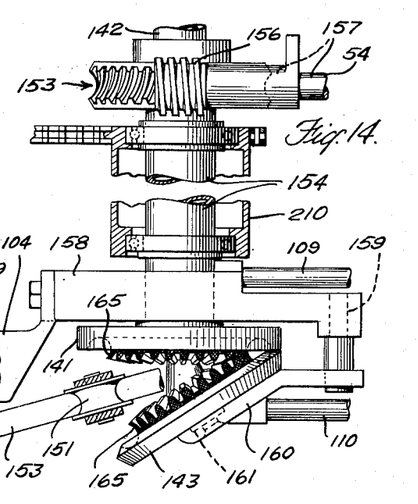
Fig. 14 is a top plan view of the mechanism shown in Fig. 13.
Figures 15, 16, 17:
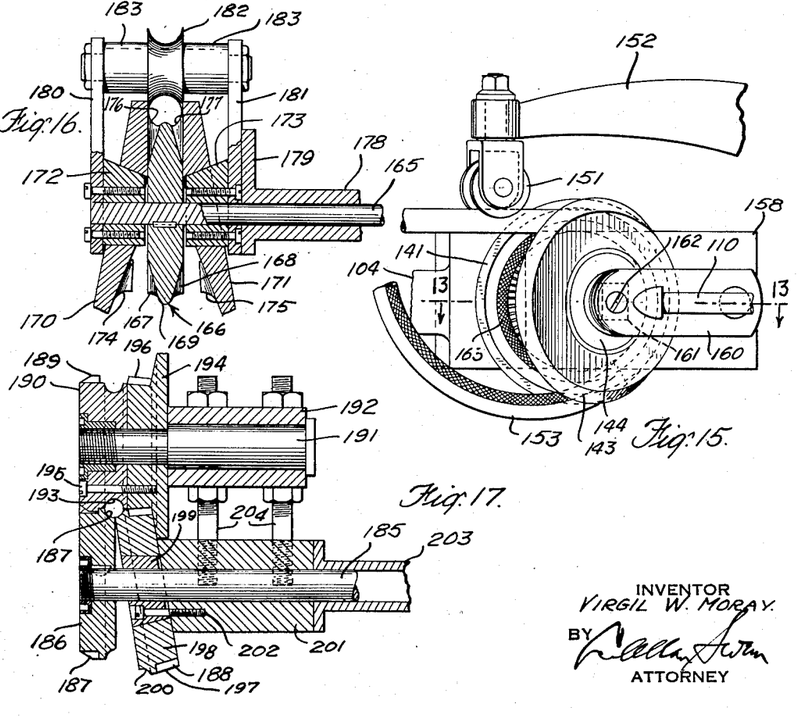
Fig. 15 is an end elevation of the mechanism shown in Fig. 14.
Fig. 16 is a sectional view of another form of bending and forming mechanism embodying the invention.
Fig. 17 is a sectional view of a further form of bending and forming mechanism.
Figure 18:
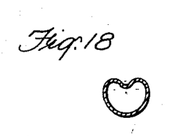
Figs. 18 to 23 are cross-sectional views of different forms of tubing which may be produced in accordance with the method and by use of the apparatus of the present invention.

Figs. 13, 14 and 15 show the straight and slant discs and their associated mechanism of a form of machine embodying the invention which operates without a radius roller as in the forms previously described. As shown, the straight disc 141 is keyed to the outer end of drive shaft 142 which may be connected to bevel gear 20 and driven by the same driving mechanism described in connection with the machine shown in Figs. 1 to 8. Slant disc 143 is freely rotatable on a frusto-conical bearing member 144 which is supported on the outer end of a rod 145 which is received within an axial bore in the outer end of the drive shaft 142. The inner end of rod 145 is provided with a thrust bearing 146 which is retained in position with the rod by nuts 147. Straight disc 141 drives slant disc 143 through bevel gears 148 and 149, and each disc is provided with an arcuate aperture intermediate its bevel gears and its outer periphery which form at the point of tangency of the discs, a circular tube receiving opening 150. The angle between the discs 141 and 143 may be varied as desired, but it should be great enough to permit the tubing to be bent to enter the opening between the discs in the manner illustrated in Figs. 14 and 15. A feed roller 151 is swivelled to the outer end of an arm 152 which corresponds to arm 61 and may be adjusted similarly. The tubing 153 is fed into the discs on a line which is midway between the two discs, as shown in Fig. 14, with the feed roller supported in position midway between the discs. Means are provided to move the discs so that their tangent point may be moved to points at different distances from the feed roller 151. The means disclosed is similar to that shown in Figs. 1 to 8. A sleeve 154 over drive shaft 142 has a worm 153 fixed to its rear end which is driven by a gear 156 on rod 157 which corresponds to rod 54 in Figs. 1 to 8. A crank or other suitable means may be provided to rotate the rod 157 about its axis and thus to rotate sleeve 154 about the shaft 142. The forward end of the sleeve 154 has fixed thereto a block 158 which carries a pin 159, one end of which is received in an aperture in one end of a connecting strap 160, the other end of which has a recess which receives snugly a square projection 161 on the frusto-conical bearing 144 of slant disc 143. A screw 162 retains the strap 160 in position. With this arrangement, it will be perceived that rotation of the sleeve 154 and the block 158 will cause the tangent point of the discs to be moved toward or away from the feed roller 151. The nearer the tangent point is moved toward the feed roller, the greater will be the diameter of the loops issuing from the discs, and the farther away the tangent point is from the feed roller, the smaller will be the diameters of the loops formed by the discs. As shown, the portions of the surfaces of the grooves in the discs which are nearest the axis of each disc, are knurled or roughened as indicated at 163 to provide a better gripping surface of the tubing, if desired for high speed operation, or for any other reason.

In operation, the results obtained by this machine are substantially the same as the results obtained by the operation of the machine shown in Figs. 1 to 8, it being understood that the mechanism shown in Figs. 13, 14 and 15 may be substituted for the equivalent mechanism of the machine of Figs. 1 to 8, excepting for the radius roller 26. When making loops only slightly larger than the diameter of the discs, the machine with the mechanism of Figs. 13, 14 and 15 will form substantially perfect loops all of equal diameter, even though the tubing being fed into the machine is composed of loops of different diameters and is crooked in other respects. When used as a machine for equalizing the sizes of loops on a feed coil, the discs 141 and 143 should be of large diameter, 20" for example, and the angle between the discs should be large enough only to permit the tubing to enter and leave the grooves.

In the form of mechanism shown in Fig. 16, three cooperating discs are employed. Drive shaft 165 has keyed thereto a center straight disc 166 having bevel gear teeth 167 and 168 on either side of the outer periphery, and an annular ridge 169 in the central portion of the outer periphery. A slant disc 170 is disposed on one side of the center disc 166 and a slant disc 171 is disposed on the other side. These slant discs 170 and 171 are freely rotatable on frusto-conical bearing members 172 and 173, and have bevel gear teeth 174 and 175 respectively, which engage with the teeth 167 and 168 of the center disc 166 which drives the slant discs. The slant discs 170 and 171 have annular tube receiving recesses 176 and 177 respectively. A rotatable sleeve 178 is mounted on the shaft 165 and has a block 179 integral therewith, or fixed thereto, and is operated in the same manner, or in a manner similar to, that in which the sleeve 45 is operated. Bearing members 172 and 173 are fixed to arms 180 and 181 respectively by bolts or the like, the outer end of which arms carry a shaft upon which is freely rotatable a radius roller 182 which is maintained in the central position of the shaft and opposite the center disc 166, by sleeves 183. Arm 181 is fixed to block 179 so that movement of sleeve 178 moves the radius roller 182 and the point at which the three discs are tangent, about the axis of the shaft 165 in the manner and for the purpose described in connection with the machine shown in Figs. 1 to 8. It is understood that the mechanism of Fig. 16 may be substituted for the equivalent mechanism of the machine shown in Figs. 1 to 8. Additionally, the ridge 169 of center disc 166 may be omitted and any other type or kind of radius roller may be used in lieu of the roller 182.

In the form of mechanism shown in Fig. 17, the radius roller is positively driven by the straight disc and the slant disc is driven positively by the radius roller. As shown, the drive shaft 185 has keyed thereto a straight disc 186 having a tube receiving annular recess 187 and peripheral teeth 188 which mesh with corresponding teeth 189 on radius roller 190 which is freely rotatable on a shaft 191 in bearing 192. Radius roller 190 has a semi-circular peripheral tube receiving groove 193 which cooperates with the groove 187. Roller 190 is also secured to an auxiliary roller 194 by bolts 195, the auxiliary roller being provided with peripheral teeth 196 which mesh with corresponding teeth 197 on the periphery of slant disc 198 which is freely rotatable on a frusto-conical bearing 199 on driven shaft 185, and is provided with an arcuate tube receiving groove 200 which cooperates with the grooves 187 and 193 to form a circular opening through which the tubing passes. Bearing 199 is fixed to a block 201 by bolts 202; the block being movable on shaft 185 and being secured to, and operable by, a sleeve 203. Bearing 192 is connected to block 201 by bolts 204 so that the radius roller shaft 191 will turn with the block 201 upon movement of sleeve 203. Bolts 204 are arranged so that by proper manipulation of the nuts on these bolts, the distance of the radius roller from the discs may be varied. It will be understood that the mechanism shown in Fig. 17 may be substituted for the corresponding mechanism in the machine shown in Figs. 1 to 8.

From the foregoing description it will be apparent that the type of tubing shown in Figs. 18 to 23, as well as other types, can be produced by machines embodying the invention. The tubing shown in Fig. 18 can be produced by the use of a radius roller having a central ridge such as the ridge 40 of Fig. 11. A radius roller having twin ridges such as shown in Fig. 12, will produce the tubing of Fig. 19. The flat portion of the tubing of Fig. 20 may be produced also by a radius roller having a corresponding flat portion. The tubing of Fig. 21 may be produced by the use of an undergrooving roller such as roller 95 of attachment 29, and the use of a radius roller having a central ridge of the proper shape. This tubing may be produced also with the mechanism shown in Fig. 16 by using a radius roller having a central ridge of the proper configuration. The rectangular type of tubing of Fig. 22 may be produced by properly shaping the tube receiving grooves of the straight and slant discs and the radius roller where the latter is employed. The tubing shown in Fig. 23 may be produced by the use of a properly contoured radius roller. It will be understood that the tubular configurations shown in Figs. 18 to 23 are shown for illustrative purposes and not by way of limitation of the types of tubing which may be produced in accordance with the invention. Many other types, kinds, or configurations may be produced with proper variations in the shape of the parts of the tube engaging surfaces.

Quite obviously, all of the parts which are disclosed as adjusted by hand, may be arranged for adjustment automatically so that for the production of any type of coil, it will only be necessary to start and stop the machine at the proper time. Many other changes may be made without departing from the principles of the invention. For example, when the tubing is fed to the discs 24 and 25 in the direction shown in Figs. 1 and 4, the bottom feed roller 28, its arm 65 and the associated adjusting mechanism may be omitted. When the tubing is fed in the reverse direction, the top feed roller, its arm and the associated adjusting mechanism may be omitted. A grooved block may be substituted for the radius roller 26 and its associated parts. The pitch rods 102 and 103 and the guard rods 109 and 110 may be cylinders that rotate on ball bearings to eliminate friction. The frusto-conical bearing in the slant discs may be a roller bearing. The feed rollers may be geared and power driven, so might the rollers of the device 29. Many parts might be given additional adjustability, for example, the length of the feed roller arms might be made adjustable. Also if desired, the radius roller 26 may be disposed in a position to the left of the top feed roller 27 as viewed in Fig. 1, and the tubing may be fed into the aperture formed by the discs and the radius roller from above while feeding against the top feed roller 27. With this method of operation, the bottom feed roller is not utilized and the tubing is coiled about the axis of the radius roller instead of about the axes of the discs.

From the foregoing, it will be perceived that the bending of tubing, rods, wire and the like may be readily and efficiently effected in accordance with the invention. The procedure heretofore disclosed for the bending or coiling of the tubing may be applied to the bending or coiling of rods, wire and the like. Additionally, the tubing, wire, rods and such, may be shaped as desired with respect to cross-sectional configuration or otherwise, either while being bent, or without bending, or substantial bending. The expressions "tube" or "tubing" as used in the claims includes rods, wire and the like so far as the invention is applicable to them, and such rods, wire and the like may be of any suitable dimensions, embracing material in sheet form. In this instance, "shaping" is intended to include grooving either longitudinally or transversely, or both, of the tubing, rods, wire or the like. Hence, the expression "bending" as used in the claims is intended to include within its scope but is not restricted to the shaping of tubing, rods, wire and the like, as well as the grooving thereof as disclosed and as indicated.

Inasmuch as changes may be made in the form, location and relative arrangement of the several parts of the apparatus disclosed, and changes may be made also in the several steps of the process disclosed and in their sequence, it will be understood that the invention is not to be limited excepting by the scope of the appended claims.

What is claimed is:

1. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each of said surfaces about an axis disposed to intersect another axis, and means for feeding tubing into said tube receiving surfaces forward of said region of close proximity thereof.

2. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each of said surfaces about an axis disposed to intersect another axis, means for feeding tubing into said tube receiving surfaces forward of said region of close proximity thereof, and means for moving said region of close proximity to adjust its distance from the tube feeding means.

3. Apparatus for bending tubing and the like comprising annular tube receiving movable surfaces each having a transverse cross-sectional configuration of an extent less than sufficient to engage the entire circumference of a tube, disposed with a portion of one surface in close proximity to a portion of another surface and with other portions of said surfaces at distances apart sufficient to permit tubing to be received therebetween, means for moving each surface about an axis disposed to intersect another axis, and means for feeding tubing into said tube receiving surfaces forward of said region of close proximity thereof.

4. Apparatus for bending tubing and the like comprising annular tube receiving movable surfaces each having a transverse cross-sectional configuration of an extent less than sufficient to engage the entire circumference of a tube, disposed with a portion of one surface in close proximity to a portion of another surface and with other portions of said surfaces at distances apart sufficient to permit tubing to be received therebetween, means for moving each surface about an axis disposed to intersect another axis, means for feeding tubing into said tube receiving surfaces forward of said region of close proximity thereof, and means for moving said region of close proximity to adjust its distance from the tube feeding means.

5. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving one of said surfaces about an axis, means causing said one surface to drive the other surface about an intersecting axis, means having a movable tube engaging surface disposed so as to engage the tubing in said region of close proximity of the tube receiving surfaces, and means for feeding tubing into said tube receiving surfaces forward of said region of close proximity thereof.

6. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means having a curved movable tube engaging surface disposed so as to engage the tubing in said region of close proximity of the tube receiving surfaces, means for simultaneously moving said last mentioned means with said region of close proximity to adjust the distance thereof from the tube feeding means, and means for feeding tubing into said tube receiving surfaces forward of said region of close proximity thereof.

7. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means having a curved movable tube engaging surface disposed so as to engage the tubing in said region of close proximity of the tube receiving surfaces, means for moving said last mentioned means together with said region of close proximity to adjust the distance thereof from the tube feeding means, means for moving said tube engaging surface to adjust its distance from the tube receiving surfaces, and means for feeding tubing into said tube receiving surfaces forward of said region of close proximity thereof.

8. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each surface about an axis disposed to intersect another axis, means for feeding tubing into said tube receiving surfaces forward of said region of close proximity thereof, and means for engaging the tubing after its discharge from the tube receiving surfaces.

9. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each surface about an axis disposed to intersect another axis, means for feeding tubing into said tube receiving surfaces forward of said region of close proximity thereof, means for engaging the tubing after its discharge from the tube receiving surfaces, and means for adjusting the distance of said last mentioned means from the tube receiving surfaces.

10. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each surface about an axis disposed to intersect another axis, means for feeding tubing into said tube receiving surfaces forward of said region of close proximity thereof, means for engaging the tubing after its discharge from the tube receiving surfaces, and means for adjusting the position of said last mentioned means laterally of the bending plane to impart pitch to the tubing after bending.

11. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means for grooving the tubing longitudinally prior to its entrance into said tube receiving surfaces, and means for feeding tubing into the tube grooving means and thereafter into said tube receiving surfaces forward of said region of close proximity thereof.

12. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means comprising cooperating tube engaging surfaces in contact with which the tubing passes prior to its entrance into the tube receiving surfaces, and means for feeding tubing into engagement with said tube engaging surfaces and thereafter into said tube receiving surfaces forward of said region of close proximity thereof.

13. Apparatus for bending tubing and the like comprising two annular tube receiving movable surfaces each having a transverse cross-sectional configuration of an extent less than sufficient to engage the entire circumference of a tube, disposed with a portion of one surface tangent to a portion of the other surface and with other portions of said surfaces at distances apart sufficient to permit tubing to be received therebetween, said surfaces providing at the point of tangency, areas which engage the entire circumference of the tubing, means for moving said surfaces, and means for feeding tubing into said tube receiving surfaces forward of said region for close proximity thereof.

14. Apparatus for bending tubing and the like comprising three annular tube receiving movable surfaces each having a transverse cross-sectional configuration of an extent less than sufficient to engage the entire circumference of a tube, disposed with a portion of one surface in close proximity to portions of the other surfaces and with other portions of said surfaces at distances apart sufficient to permit tubing to be received therebetween, means for moving said surfaces, means providing a tube engaging surface which cooperates with the said tube receiving surfaces at said region of close proximity, and means for feeding tubing into said tube receiving surfaces forward of said region of close proximity thereof.

15. Apparatus for bending tubing and the like comprising three annular tube receiving movable surfaces each having a transverse cross-sectional configuration of an extent less than sufficient to engage the entire circumference of a tube, disposed with a portion of one surface in close proximity to portions of the other surfaces and with other portions of said surfaces at distances apart sufficient to permit tubing to be received therebetween, means for moving said surfaces, means providing a tube engaging surface which cooperates with the said tube receiving surfaces at said region of close proximity, means for feeding tubing into said tube receiving surfaces forward of said region of close proximity thereof, and means for moving said region of close proximity to adjust its distance from the tube feeding means.

16. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means having a curved movable tube engaging surface disposed so as to engage the tubing in said region of close proximity of the tube receiving surfaces, means for feeding tubing into said tube receiving surfaces forward of said region of close proximity thereof, means for moving one of said movable tube receiving surfaces, means causing movement of said one tube receiving surface to move said tube engaging surface, means causing movement of said tube engaging surface to move another tube receiving surface, and means for feeding tubing into said tube receiving surfaces forward of said region of close proximity thereof.

17. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means having a curved movable tube engaging surface disposed so as to engage the tubing in said region of close proximity of the tube receiving surfaces, means for feeding tubing into said tube receiving surfaces forward of said region of close proximity thereof, means for moving one of said movable tube receiving surfaces, means causing movement of said one tube receiving surface to move said tube engaging surface, means causing movement of said tube engaging surface to move another tube receiving surface, means for adjusting the position of said tube engaging surface with respect to said tube receiving surfaces, and means for feeding tubing into said tube receiving surfaces forward of said region of close proximity thereof.

18. The method of coiling tubing which comprises causing the tubing to engage bending surface, during bending allowing the tubing to distort within a predetermined limit, after distortion restoring the tubing substantially to its initial transverse cross-sectional configuration, and during bending imparting pitch to the tubing to form the coil.

19. The method of coiling tubing which comprises causing the tubing to engage bending surface, during bending allowing the tubing to distort within a predetermined limit, after distortion forming the tubing to the desired shape, and during bending imparting pitch to the tubing to form the coil.

20. The method of bending tubing which comprises imparting such a shape to the tubing as to lessen distortion during bending, causing the shaped tubing to engage bending surface, during bending allowing the tubing to distort within a predetermined limit, and after distortion restoring the tubing substantially to its initial shape.

21. The method of bending tubing which comprises forming a longitudinal groove in that portion of the tube wall which after bending is the inner peripheral portion thereof to prevent buckling of the tubing upon being bent, causing the grooved tubing to engage bending surface, during bending allowing the tubing to distort within a predetermined limit, and after distortion restoring the tubing substantially to its shape after grooving.

22. The method of bending tubing which comprises imparting the desired shape to the tubing, causing the shaped tubing to engage bending surface, during bending allowing the tubing to distort within a predetermined limit, and after distortion restoring the tubing substantially to its initial shape.

23. The method of bending tubing which comprises preliminarily bending the tubing, causing the tubing to engage bending surface, during bending allowing the tubing to distort within a predetermined limit, and after distortion restoring the tubing substantially to its initial transverse cross-sectional configuration.

24. The method of bending tubing which comprises causing the tubing to engage bending surface, during bending allowing the tubing to distort within a predetermined limit, after distortion restoring the tubing substantially to its initial transverse cross-sectional configuration, and varying the degree of bending to produce different radii of curvature.

25. The method of bending tubing which comprises causing the tubing to engage bending surface, during bending allowing the tubing to distort within a predetermined limit, and after distortion restoring the tubing substantially to its initial transverse cross-sectional configuration while reducing the diameter of the tubing and increasing the thickness of the wall thereof.

26. Apparatus for bending tubing comprising means providing a tube receiving groove and tube engaging surface cooperating with said means and having a part receivable within the outer portion of the groove and arranged to provide substantially continuous tube engaging surface with the groove.

27. Apparatus for bending tubing comprising means providing a tube receiving groove shaped and disposed to bend the tubing and to permit distortion of the tubing while being bent, and means providing tube engaging surface cooperating with said means and having a part receivable within the outer portion of the groove and arranged to provide with the groove a tube receiving opening having a substantially continuous wall of a size less than the size of the tubing, whereby the tubing is shaped and the tubing is compressed and the thickness of the wall of the tubing is increased.

28. Apparatus for bending tubing comprising means providing a tube receiving groove shaped and disposed to bend the tubing and to permit distortion of the tubing while being bent, and means providing tube engaging surface cooperating with said means and having a part receivable within the outer portion of the groove and arranged to provide with the groove a tube receiving opening having a substantially continuous wall, and means for varying the size of the tube receiving opening while maintaining the wall of the opening substantially continuous.

29. In apparatus for bending tubing, means providing tube engaging surface shaped and adapted in one portion thereof to receive tubing distorted during bending, and in another portion thereof to restore the tubing substantially to its initial transverse cross-sectional configuration.

30. In apparatus for bending tubing, means providing a plurality of separate tube engaging surfaces each movable in a separate curved path, the paths of movement being such that more than two of said surfaces engage the same circumferential portion of the tubing simultaneously, means for moving one of said surfaces in its path, and means for moving another surface by movement of the means providing said one surface.

31. In apparatus for bending tubing, means providing a plurality of separate curved tube engaging surfaces extending in different directions, two of said surfaces extending at an acute angle to each other, each of more than two of said surfaces having a portion in juxtaposition to a portion of each of the other surfaces, said juxtaposed portions providing a tube receiving opening, and said other portions of the curved surfaces being in greater spaced relationship than the juxtaposed portions.

32. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, and means for feeding the tubing into engagement with said surfaces laterally of the plane of bending.

33. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, and means for moving said surfaces, the configuration of said surfaces being such that tubing may be fed into engagement with said surfaces laterally of the plane of bending.

34. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each of said surfaces about an axis disposed to intersect another axis, and means to vary the degree of proximity of said surfaces.

35. The method of bending tubing which comprises bringing the tubing into engagement with curved and movable bending surface having a dimension transversely of the axis of the tubing and at substantially right angles to the plane of bending which is greater than the corresponding outside dimension of the tubing, causing the tubing to remain in engagement with said bending surface and thereby to be bent, during bending allowing the tubing to flatten within a predetermined limit, and thereafter restoring the tubing substantially to its initial transverse cross-sectional configuration.

36. The method of bending tubing which comprises bringing the tubing into engagement with curved and movable bending surface having a dimension transversely of the axis of the tubing and at substantially right angles to the plane of bending which is greater than the corresponding outside dimension of the tubing, causing the tubing to remain in engagement with said bending surface and thereby to be bent, during bending allowing the tubing to flatten within a predetermined limit, and thereafter forming the tubing to the desired shape.

37. Apparatus for bending tubing comprising means providing curved and movable tube engaging surface, said surface being shaped and adapted in one position thereof to receive tubing in engagement therewith, in another portion thereof to bend the tubing while in engagement therewith and to allow the tubing to flatten within a predetermined limit during bending, and in a further portion thereof to shape the tubing while in engagement therewith to a predetermined transverse cross-sectional configuration, and means for moving said surface to effect the bending and shaping of the tubing.

38. Apparatus for bending tubing comprising means providing curved and movable tube engaging surface, said surface being shaped and adapted in one portion thereof to receive tubing in engagement therewith, in another portion thereof to bend the tubing while in engagement therewith and to allow the tubing to flatten within a predetermined limit during bending, means comprising additional movable tube engaging surface cooperating with the first-mentioned surface in a further portion thereof to shape the tubing to a predetermined transverse cross-sectional configuration, and means for moving said surfaces to effect the bending and shaping of the tubing.

39. Apparatus for bending tubing comprising means providing curved and movable tube engaging surface, said surface being shaped and adapted in one portion thereof to receive tubing in engagement therewith, in another portion thereof to bend the tubing while in engagement therewith and to allow the tubing to flatten within a predetermined limit during bending, and in a further portion thereof to grip the flattened tubing and to shape the tubing while the grip is maintained to a predetermined transverse cross-sectional configuration, and means for moving said surface to effect the bending and shaping of the tubing.

40. The method of reducing the diameter of tubing having a substantially continuous wall which comprises bringing the tubing into engagement with curved and movable bending surface having a dimension transversely of the axis of the tubing and at substantially right angles to the plane of bending which is greater than the corresponding outside dimension of the tubing, causing the tubing to remain in engagement with said bending surface and thereby to be bent, during bending allowing the tubing to flatten within a predetermined limit, and thereafter compressing the tubing without substantially crimping it and increasing the thickness of the wall of the tubing.

41. In apparatus for bending tubing, means providing a plurality of separate tube engaging surfaces each movable in a separate curved path, the paths of movement being such that more than two of said surfaces engage the same circumferential portion of the tubing simultaneously, means for moving one of said surfaces in its path, and intermeshing gear teeth on said first-mentioned means for moving another surface with said one surface.

42. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, said surfaces being movable in planes extending at an acute angle to each other, means for moving one of said surfaces about its axis, gear teeth adjacent said one surface, intermeshing gear teeth adjacent the other surface, and means for feeding tubing into said tube receiving surfaces forward of said region of close proximity thereof.

43. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means for changing the transverse cross-sectional configuration of the tubing prior to its entrance into said tube receiving surfaces, and means for feeding tubing into the tube shaping means and thereafter into said tube receiving surfaces forward of said region of close proximity thereof.

44. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving said surfaces, means comprising cooperating tube engaging rollers for changing the transverse cross-sectional configuration of the tubing prior to its entrance into said tube receiving surfaces, and means for feeding tubing into the tube shaping means and thereafter into said tube receiving surfaces forward of said region of close proximity thereof.

45. Apparatus for bending tubing and the like comprising curved tube receiving movable surfaces each of an extent to engage less than the entire circumference of a tube, disposed with a portion of one surface in close proximity to a portion of another surface and with other portions of said surfaces at distances apart sufficient to permit tubing to be received therebetween, means for moving each of said surfaces about an axis disposed to intersect another axis, means for feeding tubing into said tube receiving surfaces forward of said region of close proximity thereof, said surfaces having portions which intermesh in said region of close proximity thereof.

46. In apparatus for curving tubing, means providing movable tube engaging surface constructed and arranged to bend the tubing to change the direction of its axis to a predetermined shape, one portion of said surface embracing an area sufficient to allow the tubing to distort to provide a distorted portion thereof during the bending operation, another portion of said surface being positioned to engage the distorted portion of the tubing and to change the configuration thereof to form said portion into the predetermined final shape, and means for moving said surface to effect bending of the tubing.

VIRGIL W. MORAY.